United States Patent [19]

Feldman et al.

[11] 3,985,446
[45] Oct. 12, 1976

[54] REMOTE CONTROLLED, CRT DIGITAL DISPLAY, LLLTV CAMERA-SEXTANT
[75] Inventors: Sidney Feldman, Silver Spring, Md.; George G. Barton, Harkers Island, N.C.
[73] Assignee: The United States of America as represented by the Secretary of the Navy, Washington, D.C.
[22] Filed: Aug. 27, 1974
[21] Appl. No.: 500,987

[52] U.S. Cl. ........................ 356/144; 178/DIG. 36; 356/255
[51] Int. Cl.² ..................... G01C 1/00; G02B 27/32
[58] Field of Search .......... 356/247, 140, 253, 254, 356/255, 144; 178/DIG. 36

[56] References Cited
UNITED STATES PATENTS 3,752,591 8/1973 Feldman ............................ 356/253
3,780,221 12/1973 Narbaits-Jaureguy ....... 178/DIG. 36

OTHER PUBLICATIONS

"Day–Night . . . LLLTV . . . Celestral Navigation", Feldman et al; Navigation; pp. 116–125; vol. 20 No. 2 summer 1973.

Primary Examiner—Vincent P. McGraw
Attorney, Agent, or Firm—R. S. Sciascia; A. L. Branning; R. E. Bushnell

[57] ABSTRACT

A device to provide a ship's navigator with information day and night, as to the altitude of celestial bodies on a CRT display with digital display of the altitude and time on the CRT and/or LED read-out.

11 Claims, 3 Drawing Figures

REMOTE CONTROLLED, CRT DIGITAL DISPLAY, LLLTV CAMERA-SEXTANT

BACKGROUND OF THE INVENTION

Celestial navigation, using hand held marine sextants, has been a primary method of determining a ship's position at sea for several centuries. The hand held sextant, however, has several disadvantages in practical application. As it requires sufficient daylight illumination and weather clarity to see the stars and horizon simultaneously, observation of the altitude of stars is limited to short periods of dawn and twilight. It is difficult to operate the hand held sextant when the ship is rolling, pitching, and yawing due to heavy weather. It is useless when heavy haze or fog obscures the horizon or the stars. Moreover, certain wartime situations require that personnel not be exposed on the bridge or deck thereby rendering sextant observations impossible.

SUMMARY OF THE INVENTION

The present invention overcomes the disadvantages and limitations of the prior art by providing a sextant having a low-level-tight television camera with remotely controllable sextant optics and a visual display. This invention includes a bidirectional gauge integral with and responsive to an apparatus for controlling the angular position of the sextant optics. The device is designed to provide a ship's navigator during both night and day the altitude and time of observation via a visual display such as a cathode ray tube or light emitting diode array along with the information of the celestial body being observed and the sea horizon on the cathode ray tube.

It is therefore one object of the present invention to provide a remote controlled sextant.

It is also an object of the present invention to provide a remote controlled sextant for use during both day and night.

Another object of the present invention is to provide a remote controlled sextant for use in adverse conditions.

Another object of the present invention is to provide a remote controlled sextant for use in wartime situations. Yet another object of the present invention is to provide means for remotely controlling, gauging and remotely indicating the angular orientation of the optics of a sextant, Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
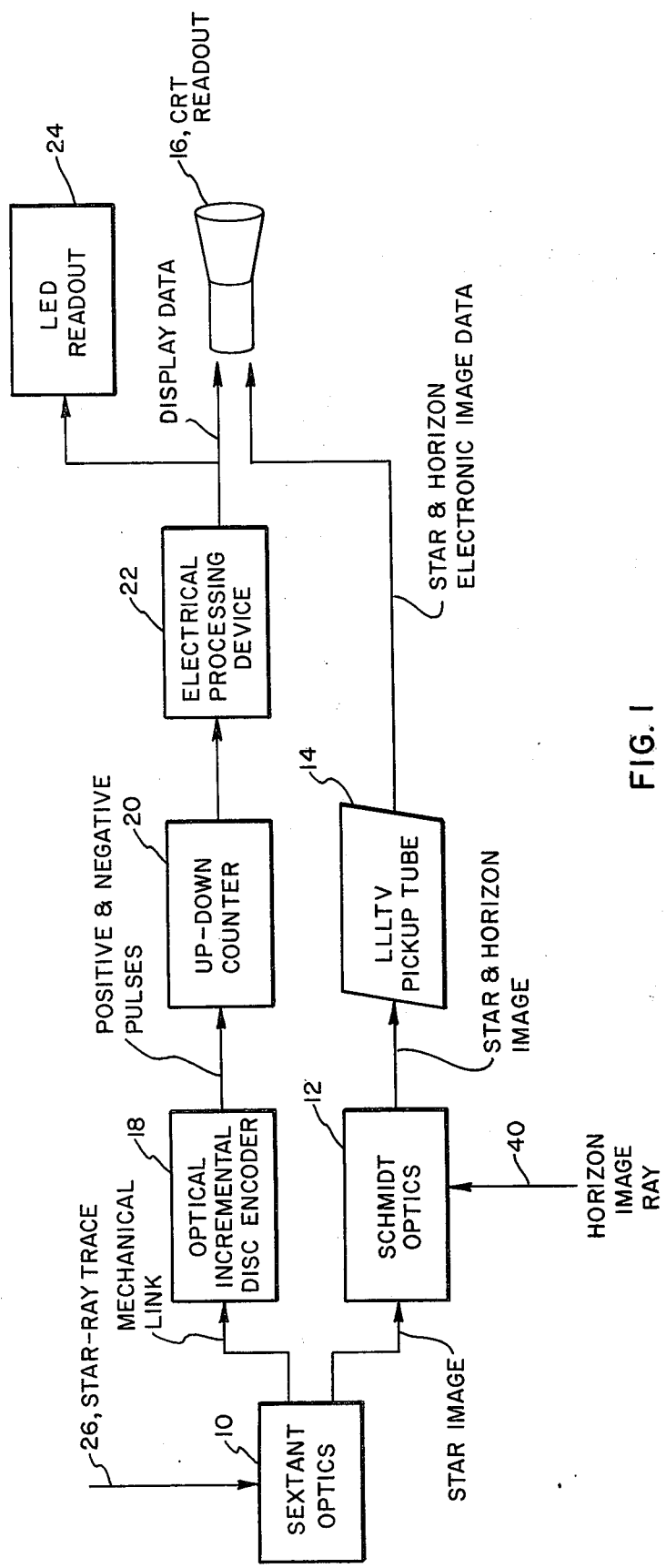
FIG. 1 is a flow diagram of the functioning of one embodiment.

FIG. 1 is a flow diagram of the operation of one embodiment. As shown therein, the image of a star or other celestial body is directed to the Schmidt optics 12 by the sextant optics 10. The celestial image which is transmitted to the Schmidt optics 12 is also combined with the image of the horizon 40 for simultaneous display. The combined images are thereafter transmitted to a low level light television (LLLTV) pickup tube 14 which has been specifically designed to be sensitive to illuminations as low as overcast starlight, about $10^{-7}$ foot candles. Operation of a LLLTV pickup tube is more fully disclosed in the Journal of The Institute of Navigation, Vol. 20, No. 2, summer 1973, pp. 116 to 120. The LLLTV pickup tube 14 functions to produce electronic signals representative of the star and horizon image data for display on a cathode ray tube (CRT) 16 for readout.

In order to direct the image of the celestial body to the Schmidt optics 12, the sextant optics 10 must be properly aligned. The bi-directional optical incremental disc encoder 18 functions during alignment to produce positive and negative pulses representative of forward and reverse changes, respectively, in the alignment of the sextant optics 10. These positive and negative pulses are accumulated in an up-down counter 20 such that the accumulated count is representative of the actual position of the sextant optics 10. This accumulated count is processed in the electrical processing device 22 to indicate the angular position of the sextant optics 10 for digital display on either the CRT 16 or on a LED readout 24.

Figure 2:
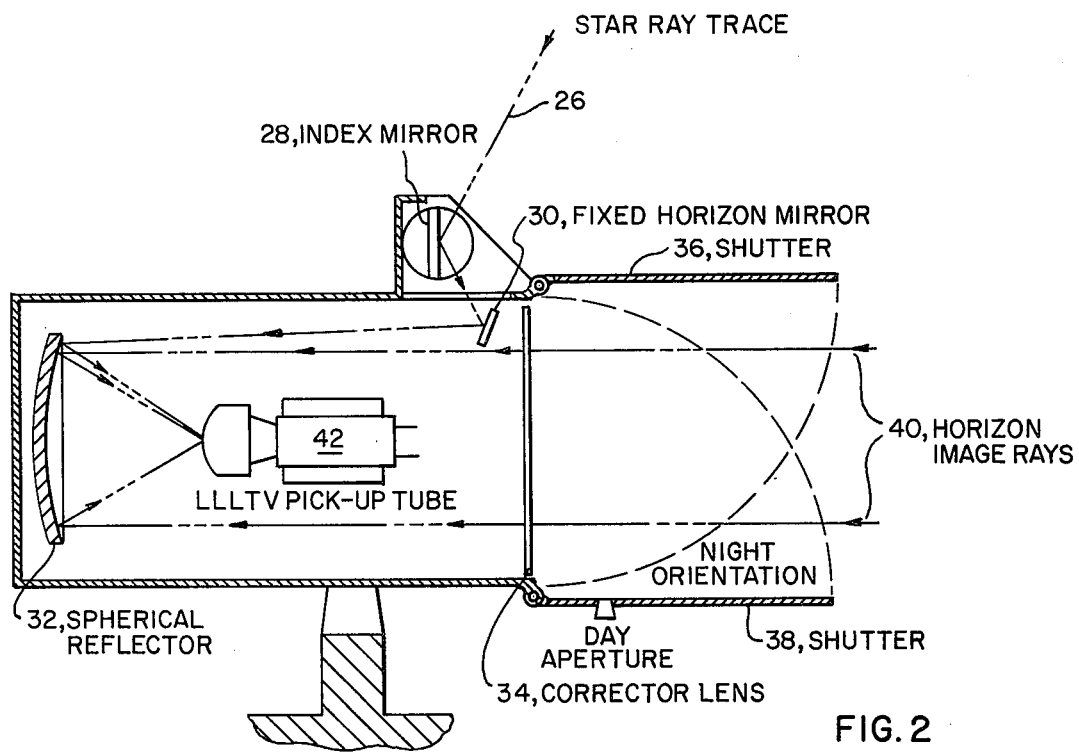
FIG. 2 is a side view of one embodiment.

The sextant optics 10, Schmidt optics 12, and pickup tube 14 are more fully disclosed FIG. 2. As shown therein, a star ray trace 26 is reflected by an adjustable index mirror 28 to a fixed horizon mirror 30 in the manner of a standard marine sextant. The star ray trace 26 is thereafter transmitted to a spherical reflector 32 which together with the corrector lens 34, and shutters 36 and 38 constitute the Schmidt optics 12 of FIG. 1. The horizon image rays 40 are combined with the star ray trace 26 by the spherical reflector 32 which focuses both of those rays on the LLLTV pickup tube 42. When the device is not in use, shutter 36 is placed into its closed position to completely block off all incoming light to protect the LLLTV pick up tube 42 from damaging radiation. Shutter 38 is used in its closed position for daytime operation.

Figure 3:
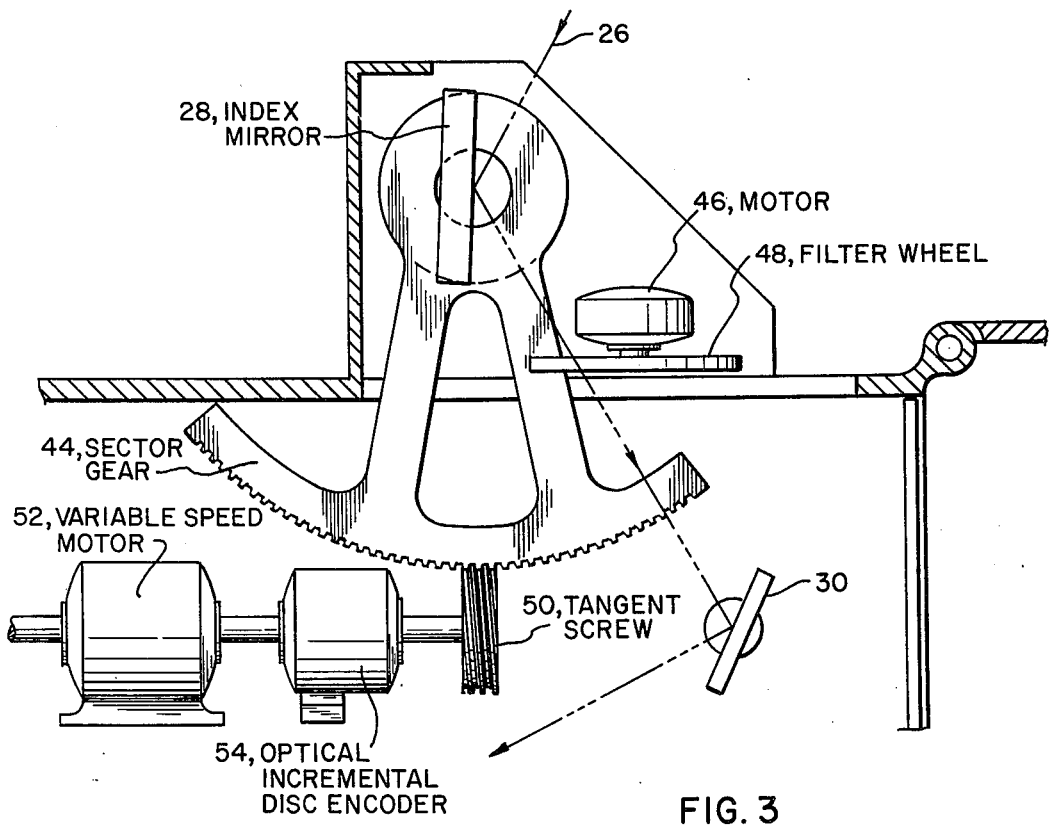
FIG. 3 is an expanded side view of the remote controlled sextant mechanism.

FIG. 3 discloses the detailed operation of the remote controlled sextant shown in FIGS. 1 and 2. The index mirror 28 is attached to a sector gear 44 which controls the angular orientation of the index mirror 28. This angle of adjustment, just as in any conventional marine sextant, is proportional to the elevation of the star when the sextant optics are aligned with the horizon at the LLLTV pickup tube 42.

A motor 46 and filter wheel 48 is provided to filter the rays of brighter celestial bodies sighted, such as the sun.

The sector gear 42 is remotely controlled by a tangent screw 50 the rotation of which is controlled by a variable speed bi-directional motor 52. The motor 52 will turn the index mirror at a fast slewing speed (about 90° per minute) to obtain course altitude and a slow speed (about 5° per minute) for the final coincidence of the celestial body with the horizon. In addition, a bi-directional optical incremental disc encoder 54 is mechanically connected by a common shaft to the bidirectional variable speed motor 52 to provide positive and negative pulses indicative of the direction of rotation of the tangent screw 50 and motor 52. As disclosed above and shown in FIG. 1, these pulses are accumulated in a conventional counter 20. This accumulated count which is indicative of the position of the sector gear 44, the angle of the index mirror 28, and the elevation of the star above the horizon, is processed for digital display in the processing device 22. The advantages of the present invention are many. It provides sextant observations throughout the night and within the ship when it is inconvenient, risky, or dangerous, for personnel to be exposed on ship's deck or bridge. In addition, stabilization of the TV camera platform in azimuth and elevation provides the capability of making sextant observation within the ship when the ship's severe roll, pitch, and yaw, under strong winds, render hand-held sextant observation difficult. The sector gear 44 and the tangent screw 50 are high precision gears that limit sextant error to a maximum of 30 seconds of arc. Index mirror 28 and horizon mirror 30 may be magnesium fluoride coated, aluminized front surface mirrors. Also, the digital display of star altitude and range date decreases chance of reading errors. Sextant and range observations therefore become a one-man operation especially if digital sextant data output is transmitted to a computer for automatic and rapid sight reduction calculations.

In considering the foregoing detailed description it is apparent that the teachings of the present invention disclose a remotely controllable instrument aid to general navigation having an improved utility over prior art sextants. Embodiment constructed according to the present teachings permit a navigator within a vessel to take sightings when weather or sea conditions make taking of sightings under the prior art hazardous.

Obviously many modifications and variations of the present invention are possible in light of the above teachings. For example, the present invention is not limited to a camera utilizing Schmidt optics but any optical camera providing the proper optical image information. The embodiment shown in FIGS. 2 and 3 describes a reflective type of camera. The present invention could be embodied in a refractive type camera which uses an objective lens to focus the image onto the photosensitive surface of the pickup tube. In addition, prisms can be used rather than mirrors in the design of the system. It is therefore to be understood that within the scope of the appended claims the invention may be practiced otherwise than as specifically described.

What is claimed as new and desired to be secured by Letters Patent of the United States is:

1. A remote controlled sextant comprising:
   remotely adjustable sextant optics for reflecting an image of a celestial body;
   optical incremental disc encoder means mechanically linked to said sextant optics for producing pulses indicative of angular movement of said sextant optics;
   counter means for accumulating said pulses to indicate said angular position of said sextant optics and thereby the elevation of said celestial body for digital display on a display device;
   additional optics for combining said image of said celestial body with a horizon image;
   electronic pickup means for detecting said combined image of said horizon and said celestial body and converting it into an electronic signal for display on said display device;
   wherein the elevation of said celestial body is displayed on said digital display device when said remotely adjustable sextant optics are adjusted so that said celestial body is aligned with said horizon on said display device.

2. The sextant of claim 1 wherein said counter means comprises an up-down counter.

3. The sextant of claim 1 wherein said additional optics comprises Schmidt optics.

4. The sextant of claim 1 wherein said electronic pickup means comprises a low level light television pickup tube.

5. The sextant of claim 1 wherein said sextant optics comprises:
   a fixed horizon mirror;
   a variable speed motor;
   a tangent screw connected to said variable speed motor;
   a sector gear connected to said tangent screw so that the angular rotation of said sector gear is adjusted by said tangent screw,
   index mirror means connected to said sector gear.

6. The sextant of claim 5 wherein said counter means comprises an up-down counter.

7. The sextant of claim 5 wherein said additional optics comprises Schmidt optics.

8. The sextant of claim 5 wherein said electronic pickup means comprises a low level light television pickup tube.

9. A sextant comprising:
   adjustable sextant optics for reflecting a first image;
   additional optics for combining said first image with a horizon image;
   camera tube means for detecting the combined image of said first and horizon images and generating an output signal representative of the combined image;
   an electronic display device electrically receptive to and capable of displaying a manifestation of said representative signal;
   whereby said manifestation may be displayed at a location different from that occupied by said sextant.

10. The sextant of claim 9 comprising:
    adjusting means susceptible to remote control and connected to said sextant optics for varying the angular orientation of said sextant optics;
    gauging means integral with and responsive to said adjusting means for generating electrical pulses indicative of a change in the angular orientation of said sextant optics;
    a counter connected to the output of said gauging means for receiving and accumulating said electrical pulses and providing an electrical signal to said display device indicative of the angular orientation of said sextant optics;
    whereby a representation of the angular orientation of said sextant optics may be displayed at a location visually remote from that occupied by said sextant.

11. The sextant of claim 10 comprising a stabilizing platform attached to a moveable vehicle subjected to roll, pitch and yaw, for supporting said sextant optics and for flexibly retaining said additional optics in fixed relation with said camera tube whereby the orientation of said sextant optics with respect to said additional optics is independent of the roll, pitch and yaw of said vehicle.

* * * * *